Oct. 15, 1935.  E. S. COOK  2,017,682
TRAIN CONTROL APPARATUS
Filed Aug. 8, 1927
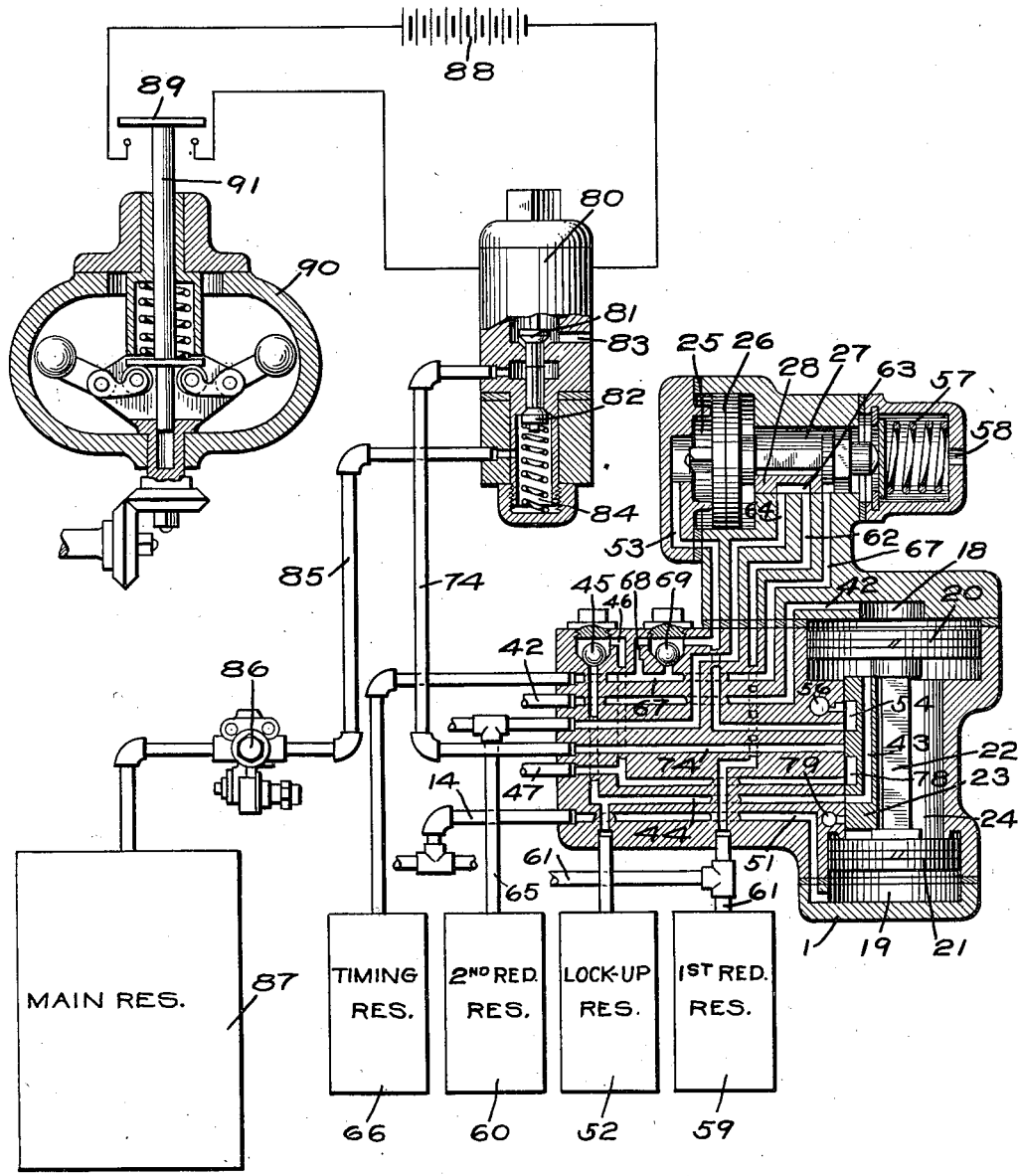
INVENTOR
EARLE S. COOK
BY Wm. M. Cady
ATTORNEY Patented Oct. 15, 1935

2,017,682

UNITED STATES PATENT OFFICE 2,017,682

TRAIN CONTROL APPARATUS

Earle S. Cook, Wilmerding, Pa., assignor to The Westinghouse Air Brake Company, Wilmerding, Pa., a corporation of Pennsylvania Application August 8, 1927, Serial No. 211,347

5 Claims. (Cl. 303—18)

This invention relates to automatic train control apparatus, and more particularly to means for effecting a reduction in brake pipe pressure in two stages.

Under certain conditions, it is desirable to prevent the reduction in brake pipe pressure in two stages and to effect a single continuous reduction in brake pipe pressure.

The principal object of my invention is to provide electrically controlled means for determining whether the brake pipe pressure shall be reduced in two stages or continuously.

In the accompanying drawing, the single figure is a diagrammatic sectional view of an apparatus for effecting a reduction in brake pipe pressure in two stages and embodying my invention.

The means for effecting a reduction in brake pipe pressure in two stages may be similar to that disclosed in the prior pending application of T. H. Thomas and E. S. Cook, Serial No. 109,044, filed May 14, 1926, and may comprise a control valve device 1 having a large piston chamber 18 and a small piston chamber 19 containing pistons 20 and 21 respectively, said pistons being connected by a stem 22 and being adapted to operate a slide valve 23 contained in the intermediate valve chamber 24.

The control valve casing also has a piston chamber 25 containing a piston 26 and a valve chamber 27 containing a slide valve 28 adapted to be operated by piston 26. The first reduction reservoir 59 is connected to a passage 62 leading to the seat of slide valve 28 and is also connected to a pipe 61 which leads to the seat of an application valve device (not shown), which is operated when the train control apparatus functions, to connect the first reduction reservoir with the equalizing reservoir of an equalizing discharge valve mechanism, as in the prior application hereinbefore referred to, so that the discharge valve mechanism is operated to effect a predetermined reduction in brake pipe pressure.

The pipe and passage 42, leading to the piston chamber 18, is connected to the discharge port of the equalizing discharge valve mechanism, so that piston 20 is subject to the pressure of fluid discharged by operation of the equalizing discharge valve mechanism in effecting an application of the brakes.

According to the present invention, electrically controlled speed governed means are provided for preventing the operation of the apparatus to effect a two stage reduction in brake pipe pressure when the speed of the train is above a predetermined degree.

For this purpose a magnet 80 is provided and double beat valves 81 and 82 adapted to be operated by said magnet. When the magnet is energized the valve 81 is held seated while the valve 82 is unseated. The pipe 74 leading to the seat of slide valve 23 is connected to exhaust port 83 when the valve 81 is unseated and said pipe is supplied with fluid under pressure when the valve 82 is unseated, the valve chamber 84 being connected to a pipe 85, through which a feed valve device 86 supplies fluid under pressure from a main reservoir 87.

When the equalizing discharge valve mechanism is not open, the piston chamber 18 is maintained at atmospheric pressure and the valve chamber 24 is also maintained at atmospheric pressure by way of port 43 in slide valve 23, passage 44, past check valve 45, passage 46, and pipe 47, which pipe is connected to an exhaust port through the application valve device (not shown).

The brake pipe 14 is connected to piston chamber 19 through passage 51 and the piston chamber 18 and valve chamber 24 being at atmospheric pressure, the brake pipe pressure in piston chamber 19 holds the valve device in its upper position, as shown in the drawing. The lock-up reservoir 52 being connected to passage 44, is also maintained at atmospheric pressure.

In the normal position of slide valve 23, the piston chamber 25 is connected to the atmosphere, through passage 53, cavity 54 in slide valve 23, and through restricted port 56 to the atmosphere. The spring 57 then holds the slide valve 28 and piston 26 in the position shown, the valve chamber 27 being constantly open to the atmosphere through a port 58.

In this position, the first reduction reservoir 59 is connected to the second reduction reservoir 60 through pipe 61, passage 62, cavity 63 in slide valve 28, and passage 64 and pipe 65.

The timing reservoir 66 is open to the atmosphere by way of passage 67, restricted port 68, and past check valve 69 to passage 53. Passage 67 is also open to the valve chamber 27, and consequently to the atmosphere.

The magnet 80 is in circuit with a source of electric current 88 and said circuit is controlled by a switch member 89 adapted to be operated by a speed governor 90. Said speed governor being connected up to rotate at a speed proportioned to the speed of the train. When the speed of the train exceeds a predetermined degree, the switch member 89 is operated by the governor rod 91 to open the circuit of the magnet 80, as shown in the drawing, and when the speed of the train is below a predetermined limit, the switch member 89 is operated to close the magnet circuit.

When the train control apparatus operates to cause the movement of the application valve device (not shown), the equalizing reservoir (not shown) is connected to the first reduction reservoir 59 and the pressure in the equalizing reservoir is reduced by equalization into the reduction reservoir, so as to cause the operation of the equalizing discharge valve mechanism to vent fluid from the brake pipe and cause an application of the brakes in the usual manner.

Fluid vented from the brake pipe by operation of the equalizing discharge valve mechanism is supplied through pipe and passage 42 to the piston chamber 18.

When the pressure in the piston chamber 18 has been increased to a predetermined degree, the piston 20 is shifted downwardly and slide valve 23 is moved to a position in which passage 53 is connected through cavity 54 with passage 74.

If the speed of the train is below a predetermined limit, the speed governor 90 operates to cause the switch member to close the magnet circuit and the magnet 80 being energized the valve 81 will be held seated, while the valve 82 will be unseated, permitting the flow of fluid under pressure to the pipe 74 and consequently through cavity 54 to passage 53. The piston 26 is then shifted to its outer position, in which communication between the first and the second reduction reservoirs is cut off. Consequently, the first reduction in brake pipe pressure is effected by equalization of the equalizing reservoir into the first reduction reservoir only.

Fluid under pressure also flows from passage 53, through the restricted port 68 and passage 67 to the timing reservoir 66, charging said reservoir at a predetermined rate.

As the equalizing discharge valve moves to cut off the discharge of fluid from the brake pipe, the pressure in piston chamber 18 reduces, until a point is reached, at which the brake pipe pressure in piston chamber 19 operates to shift the piston 21 upwardly. The upward movement of piston 21 causes the slide valve 23 to be shifted, so that passage 53 is connected to the atmosphere, through cavity 54 and restricted port 56. The fluid pressure in the timing reservoir 66 and in the piston chamber 25 then reduces and when the pressure in piston chamber 25 is reduced to a predetermined degree, the spring 57 operates to shift the slide valve 28 and piston 26 to the left hand position, in which cavity 63 connects the passages 62 and 64.

The first reduction reservoir 59 is now connected to the second reduction reservoir 60 and consequently, the pressure in the equalizing reservoir is further reduced by equalization into the second reduction reservoir. The equalizing discharge valve mechanism then operates to vent fluid from the brake pipe to cause a second reduction in brake pipe pressure.

If the speed of the train exceeds a predetermined limit, then the circuit of the magnet 80 will be opened and with the magnet deenergized, the valve 82 will be seated and the valve 81 will be unseated. The pipe 74 is therefore connected to the exhaust port 83, so that when the piston 20 moves downwardly, as hereinbefore described, the piston chamber 25 is connected to the atmosphere through cavity 54 and passage 74, with the result that the piston 26 holds the slide valve 28 in the position connecting the first reduction reservoir with the second reduction reservoir.

Consequently, the equalizing reservoir is initially connected to both reduction reservoirs and only a single stage reduction in brake pipe pressure is effected, since with the equalizing reservoir initially connected to the two reduction reservoirs, no further reduction can occur when the pistons 20 and 21 move the slide valve 23 to its upper position, as will be evident.

Having now described my invention, what I claim as new and desire to secure by Letters Patent, is:—

1. In a fluid pressure brake, the combination with a brake pipe and valve means for effecting a service application of the brakes by a reduction in brake pipe pressure in two stages, of means controlled electrically and according to the speed of the train for rendering said valve means to cause a reduction in brake pipe pressure in a single stage.

2. In a fluid pressure brake, the combination with a brake pipe and valve means for effecting a reduction in brake pipe pressure in two stages, and having a position in which a reduction in brake pipe pressure in a single stage is affected of a magnet valve device operative upon the deenergization for effecting the movement of said valve means to said position and a speed governor controlling the circuit of said magnet valve device and operative when the speed of the train exceeds a predetermined limit for effecting the deenergization of said magnet valve device.

3. In a fluid pressure brake, in combination, a brake pipe, two reduction reservoirs, the venting of fluid pressure into which is adapted to effect a reduction in brake pipe pressure, a valve having one position in which said reservoirs are connected together and another position in which communication between said reservoirs is cut off, a movable abutment operated by variations in fluid pressure for operating said valve, a magnet valve means operative to vary the fluid pressure on said movable abutment, and a valve device operated by variations in fluid pressure for controlling communication through which said magnet valve means operates to vary the fluid pressure on said abutment.

4. In a fluid pressure brake, in combination, a brake pipe, two reduction reservoirs, the venting of fluid pressure into which is adapted to effect a reduction in brake pipe pressure, a valve having one position in which said reservoirs are connected together and another position in which communication between said reservoirs is cut off, a movable abutment operated by variations in fluid pressure for operating said valve, a magnet valve means operative to vary the fluid pressure on said movable abutment, a speed governor controlled by the speed of the train for controlling the circuit of said magnet valve means, and a valve device operated by variations in fluid pressure for controlling communication through which said magnet valve means operates to vary the fluid pressure on said abutment.

5. In a fluid pressure brake, in combination, a brake pipe, two reduction reservoirs, the venting of fluid pressure into which is adapted to effect a reduction in brake pipe pressure, a valve having one position in which said reservoirs are connected together and another position in which communication between said reservoirs is cut off, a movable abutment operated by variations in fluid pressure for operating said valve, a magnet valve means operative to vary the fluid pressure on said movable abutment, a speed governor controlled by the speed of the train for controlling the circuit of said magnet valve means, and a valve device operated by variations in fluid pressure upon a change in the signal indication for controlling communications through which said magnet valve means operates to vary the fluid pressure on said abutment.

EARLE S. COOK.